United States Patent
Gorny et al.

(10) Patent No.: US 12,026,978 B2
(45) Date of Patent: *Jul. 2, 2024

(54) MEASURING AND TRANSMITTING EMOTIONAL FEEDBACK IN GROUP TELECONFERENCES

(71) Applicant: Nextiva, Inc., Scottsdale, AZ (US)

(72) Inventors: Tomas Gorny, Scottsdale, AZ (US); Jean-Baptiste Martinoli, St Anaclet de Lesard (CA); Tracy Conrad, Scottsdale, AZ (US); Lukas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,946

(22) Filed: May 30, 2022

(65) Prior Publication Data
US 2022/0292879 A1  Sep. 15, 2022

Related U.S. Application Data

(63) Continuation of application No. 16/845,739, filed on Apr. 10, 2020, now Pat. No. 11,348,368.
(Continued)

(51) Int. Cl.
*G06V 40/16* (2022.01)
*H04N 7/15* (2006.01)

(52) U.S. Cl.
CPC ............. *G06V 40/174* (2022.01); *H04N 7/15* (2013.01)

(58) Field of Classification Search
CPC ............ H04N 7/15; H04N 7/14; H04N 7/141; H04N 2007/145; H04N 1/32; H04N 7/12;
(Continued)

(56) References Cited

U.S. PATENT DOCUMENTS

| 6,088,040 A | 7/2000 | Oda et al. |
| 9,041,766 B1 | 5/2015 | Gates et al. |

(Continued)

OTHER PUBLICATIONS

European Search Report for Application No. 20833316.1 dated Jun. 5, 2023. 11 Pages.
(Continued)

*Primary Examiner* — Maria El-Zoobi
(74) *Attorney, Agent, or Firm* — Spencer Fane LLP; Steven J. Laureanti

(57) ABSTRACT

A system and method are disclosed for generating a teleconference space for two or more communication devices using a computer coupled with a database and comprising a processor and memory. The computer generates a teleconference space and transmits requests to join the teleconference space to the two or more communication devices. The computer stores in memory identification information for each of the two or more communication devices. Each of the two or more communication devices stores audiovisual data pertaining to one or more users associated with each of the two or more communication devices. Each communication device converts the audiovisual data into facial expressions data, generates emotions data from the facial expressions data, generates attention data from the emotions data, and transmits the attention data from the communication device to the computer. The computer displays the attention data.

20 Claims, 8 Drawing Sheets

Related U.S. Application Data

(60) Provisional application No. 62/867,361, filed on Jun. 27, 2019.

(58) Field of Classification Search
CPC .... H04N 7/157; H04M 1/72519; H04M 3/56; H04M 2207/18; H04M 2250/62; H04W 4/06
USPC .............................................. 348/14.02–14.9
See application file for complete search history.

(56) References Cited

U.S. PATENT DOCUMENTS

| | | | |
|---|---|---|---|
| 9,576,190 | B2 | 2/2017 | Shaburov et al. |
| 9,636,070 | B2 | 5/2017 | Kassem et al. |
| 9,639,770 | B2 | 5/2017 | Paradkar et al. |
| 9,734,410 | B2 | 8/2017 | Gottlieb |
| 10,382,722 | B1 | 8/2019 | Peters et al. |
| 10,956,831 | B2 | 3/2021 | Bellamy et al. |
| 11,017,239 | B2 | 5/2021 | Pranger et al. |
| 2007/0168315 | A1* | 7/2007 | Covannon ............. G06F 40/166 |
| 2011/0295392 | A1* | 12/2011 | Cunnington ........... G06Q 10/10 702/19 |
| 2015/0288797 | A1* | 10/2015 | Vincent ................. G16H 10/60 455/404.2 |
| 2016/0198125 | A1 | 7/2016 | Cunico et al. |
| 2018/0070050 | A1* | 3/2018 | Hansen ................... G09G 5/00 |
| 2019/0034706 | A1 | 1/2019 | Kaliouby et al. |
| 2019/0273767 | A1* | 9/2019 | Nelson ................. H04M 7/0027 |
| 2021/0076002 | A1* | 3/2021 | Peters .................... H04N 7/152 |

OTHER PUBLICATIONS

Dragos Datcu et al: "Facial expression recognition in still pictures and videos using active appearance models", ACM International Conference Proceeding Series, ACM, University of Rousse, Bulgaria, Jun. 14, 2007 (Jun. 14, 2007), pp. 1-6, XP058098356, DOI: 10.1145/1330598.1330717, ISBN: 978-954-9641-50-9.

Liliana Dewi Yanti et al.: "Review of Automatic Emotion Recognition Through Facial Expression Analysis", 2018 International Conference on Electrical Engineering and Computer Science (ICECOS), IEEE, Oct. 2, 2018 (Oct. 2, 2018), pp. 231-236, XP033495015, DOI: 10.1109/ICECOS.2018.8605222 [retrieved on Jan. 7, 2019].

Shiro Kumano et al: "Pose-Invariant Facial Expression Recognition Using Variable-Intensity Templates", International Journal of Computer Vision, Kluwer Academic Publishers, BO, vol. 83, No. 2, Nov. 15, 2008 (Nov. 15, 2008), pp. 178-194, XP019690437, ISSN: 1573-1405.

Masaki Ishii et al. "Generation of emotional feature space for facial expression recognition using self-mapping", SICE Annual Conference (SICE), 2012 Proceesings of, IEEE, Aug. 20, 2012 (Aug. 20, 2012), pp. 1004-1009, XP032259866, ISBN: 978-1-4673-2259-1.

International Search Report for Application No. PCT/US2020/037529 dated Sep. 2, 2020. 2 Pages.

* cited by examiner

MEASURING AND TRANSMITTING EMOTIONAL FEEDBACK IN GROUP TELECONFERENCES

CROSS-REFERENCE TO RELATED APPLICATIONS

This application is a continuation of U.S. patent application Ser. No. 16/845,739, filed on Apr. 10, 2020, entitled "Measuring and Transmitting Emotional Feedback in Group Teleconferences," which claims the benefit under 35 U.S.C. § 119(e) to U.S. Provisional Application No. 62/867,361, filed Jun. 27, 2019, and entitled "Measuring and Transmitting Emotional Feedback in Group Teleconferences." U.S. patent application Ser. No. 16/845,739 and U.S. Provisional Application No. 62/867,361 are assigned to the assignee of the present application.

TECHNICAL FIELD

The present disclosure relates generally to electronic teleconferencing systems and more specifically to measuring and transmitting the emotional feedback of users participating in teleconference systems.

BACKGROUND

Teleconference systems may utilize communication networks, including but not limited to the internet, to connect communication systems and communication devices such as computers, tablet computers, and/or smartphones. Teleconference systems may permit communication systems to share visual imagery and audio data associated with a speaking user with other communication systems. However, teleconference systems may not provide a speaking user with useful audience feedback as the speaking user delivers a teleconference presentation, and may prevent the speaking user from assessing the current attention level and emotional state of the audience participating in the teleconference presentation.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to more detailed descriptions presented below.

In embodiments of the disclosed subject matter, the unique systems and methods described herein make use of an exemplary system and method to measure and transmit emotional feedback in group teleconferences. Embodiments of the disclosed subject matter include two or more communication systems, including but not limited to tablet computers or smartphones, and a computer coupled with a database and comprising a processor and memory. The computer generates a teleconference space and transmits requests to join the teleconference space to the two or more communication systems. The computer stores in memory identification information for each of the two or more communication systems. Each of the two or more communication devices stores audiovisual data pertaining to one or more users associated with each of the two or more communication devices In embodiments of the disclosed subject matter, each communication device converts the audiovisual data into facial expressions data, generates emotions data from the facial expressions data, generates attention data from the emotions data, and transmits the attention data from the communication device to the computer. The computer displays the attention data.

These and other features of the disclosed subject matter are described in greater detail below.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
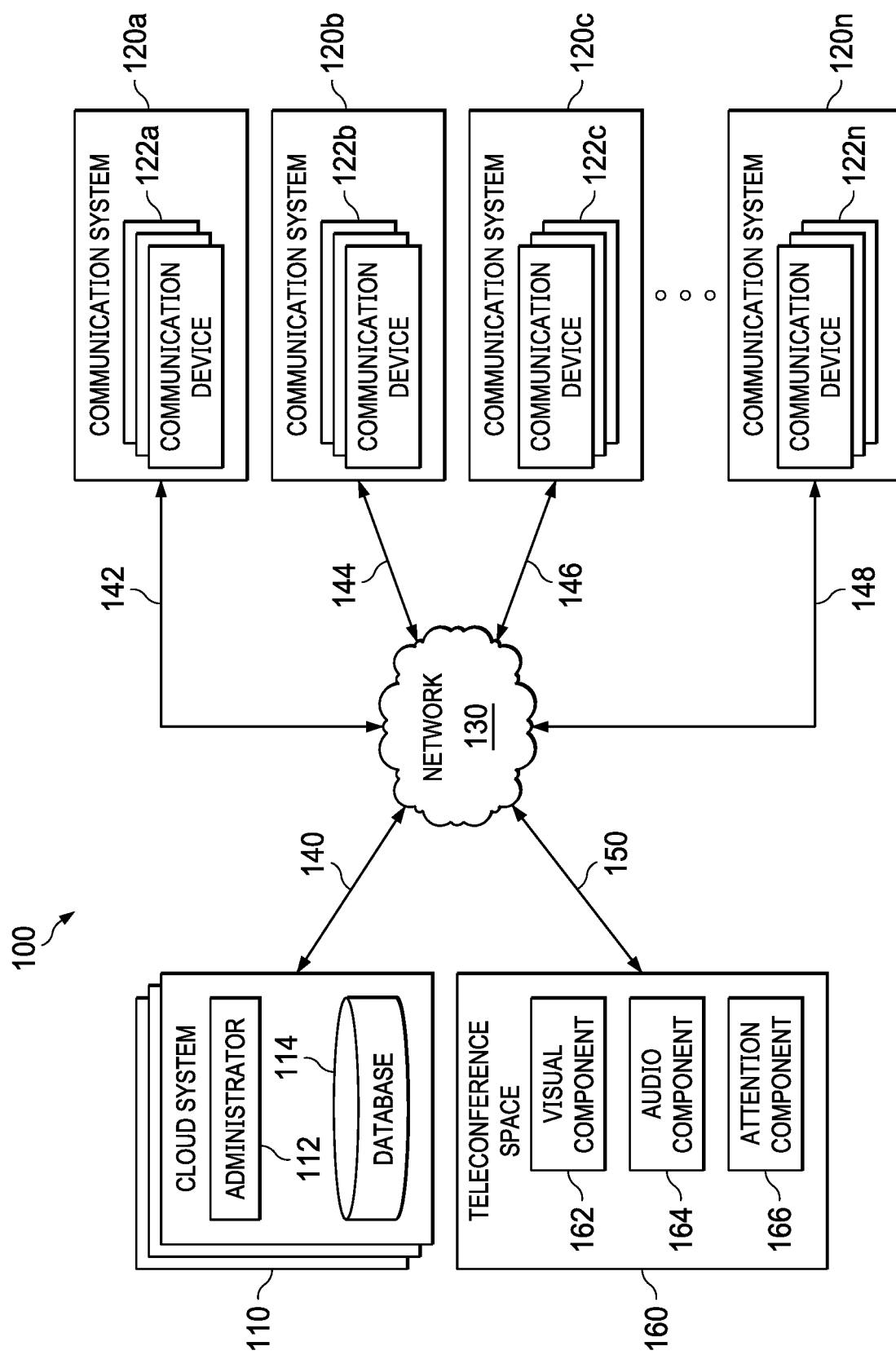
FIG. 1 illustrates an exemplary teleconference system, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, embodiments of the following disclosure relate to measuring and transmitting the emotional feedback of users participating in a group teleconference. Embodiments of the following disclosure generate a teleconference space that includes a plurality of separate communication systems, each of which comprises one or more communication devices controlled by an individual user or group of users. Embodiments of the teleconference space comprise a visual component, which may include video imagery, and an audio component, which may comprise audio from a speaking user. Embodiments transmit the visual component and the audio component of the teleconference space as a single outbound teleconference stream to the plurality of separate communication systems, each of which displays the outbound teleconference stream to the one or more associated users. Each of the plurality of communication systems measures and analyzes the emotions of an associated user, and transmits this information to one or more other locations in the teleconference space.

Embodiments of the following disclosure enable a user to receive real-time information regarding the emotions and attention engagement of the one or more users associated with the plurality of separate communication systems participating in the teleconference space. Embodiments may permit speaking users to tailor their teleconference presentations based on real-time user emotional and/or attention feedback.

FIG. 1 illustrates exemplary teleconference system 100, according to a first embodiment. Teleconference system 100 comprises one or more cloud systems 110, one or more communication systems 120 each of which comprises one or more communication devices 122, network 130, communication links 140-150, and teleconference space 160. Although one or more cloud systems 110, one or more communication systems 120a-120n, one or more communication devices 122a-122n, single network 130, communication links 140-150, and single teleconference space 160 are shown and described, embodiments contemplate any number of cloud systems 110, communication systems 120, networks 130, communication links 140-150, or teleconference spaces 160, according to particular needs.

In one embodiment, cloud system 110 comprises administrator 112 and database 114. Administrator 112 generates teleconference space 160 in which one or more communication systems 120, each comprising one or more communication devices 122 and one or more associated users, may participate. Database 114 comprises one or more databases or other data storage arrangements at one or more locations local to, or remote from, cloud system 110. In one embodiment, one or more databases 114 is coupled with the one or more administrators 112 using one or more local area networks (LANs), metropolitan area networks (MANs), wide area networks (WANs), or network 130, such as, for example, the Internet, or any other appropriate wire line, wireless link, or any other communication links 140-150. One or more databases 114 stores data that is made available to and may be used by one or more administrators 112 according to the operation of teleconference system 100. According to embodiments, administrator 112 hosts and runs one or more runtime processes associated with cloud system 110.

According to embodiments, each of one or more communication systems 120 comprises one or more associated users such as, for example, an individual person or customer, one or more employees or teams of employees within a business, or any other individual, person, group of persons, business, or enterprise which communicates or otherwise interacts with one or more separate communication systems 120. Although an exemplary number of communication systems 120 are shown and described, embodiments contemplate any number of communication systems 120 interacting with network 130 and one or more cloud systems 110 according to particular needs. As an example only and not by way of limitation, teleconference system 100 may allow up to 50, 100, 500, or 1,000 separate communication systems 120 to join and participate in teleconference space 160 simultaneously.

Each of one or more communication systems 120 comprises one or more communication devices 122, such as, for example, cellular phones or smartphones, desktop computers, laptop computers, notebook computers, tablet-type devices, terminals, or any other communication device 122 capable of receiving, transmitting, and displaying audiovisual information through network 130. In an embodiment, each of one or more communication devices 122 may comprise an audiovisual recording device, such as a computer camera and microphone, and an audiovisual display device, such as an electronic display screen and one or more speakers. The audiovisual display devices permit each of the one or more users interacting with each of one or more communication devices 122 to see and hear visual component 162 and audio component 164 of teleconference space 160. The audiovisual recording devices record audiovisual information regarding the one or more users associated with one or more communication devices 122. In addition, each of one or more communication devices 122 may comprise an input device, such as a keyboard, mouse, or touchscreen.

Each of one or more communication devices 122 that comprise each of one or more communication systems 120 may be coupled with other communication devices 122, as well as one or more cloud systems 110, by network 130 via communication links 140-150. Although communication links 140-150 are shown connecting each of one or more communication systems 120, respectively, to network 130, embodiments contemplate any number of communication links 140-150 connecting any number of communication systems 120 or communication devices 122 with network 130, according to particular needs. In addition, or as an alternative, communication links 140-150 may connect one or more communication systems 120 and/or communication devices 122 directly to one or more cloud systems 110 and/or one or more separate communication systems 120 and/or communication devices 122.

According to embodiments, one or more communication links 140-150 couple one or more cloud systems 110, including its administrator 112 and database 114, one or more communication systems 120, and teleconference space 160 with network 130. Each communication link 140-150 may comprise any wireline, wireless, or other link suitable to support data communications between one or more cloud systems 110 and network 130. Although communication links 140-150 are shown as generally coupling one or more cloud systems 110 and one or more communication systems 120 with network 130, one or more cloud systems 110 and one or more communication systems 120 may communicate directly with each other according to particular needs.

According to embodiments, network 130 includes the Internet, telephone lines, any appropriate LANs, MANs, or WANs, and any other communication network coupling one or more cloud systems 110 and one or more communication systems 120. For example, data may be maintained by one or more cloud systems 110 at one or more locations external to one or more cloud systems 110, and made available to one or more cloud systems 110 or one or more communication systems 120 using network 130, or in any other appropriate manner.

According to embodiments, one or more cloud systems 110 and/or one or more communication systems 120 may each operate on one or more computers that are integral to or separate from the hardware and/or software that supports teleconference system 100. In addition, or as an alternative, the one or more users may be associated with teleconference system 100 including one or more cloud systems 110 and/or one or more communication systems 120. These one or more users may include, for example, one or more computers programmed to generate teleconference space 160 and measure and transmit the emotional feedback of users participating in teleconference space 160 autonomously. As used herein, the computer, the term "computer," and "computer system" comprise an input device and an output device. The computer input device includes any suitable input device, such as a keypad, mouse, touch screen, microphone, or other device to input information. The computer output device comprises any suitable output device that may convey information associated with the operation of teleconference system 100, including digital or analog data, visual information, or audio information. According to embodiments, the one or more computers include any suitable fixed or removable non-transitory computer-readable storage media, such as magnetic computer disks, CD-ROMs, or other suitable media to receive output from and provide input to teleconference system 100. The one or more computers also include one or more processors and associated memory to execute instructions and manipulate information according to the operation of teleconference system 100.

Embodiments contemplate one or more cloud systems 110 generating teleconference space 160. Each of the one or more communication systems 120 and/or one or more communication devices 122 that comprise each communication system 120 may connect to one or more cloud systems 110 using network 130 and communication links 140-150, and may participate in teleconference space 160. Teleconference space 160 enables the one or more communication systems 120 and/or one or more communication devices 122 to conduct and participate in an audiovisual teleconference. Teleconference space 160 may comprise visual component 162, audio component 164, and/or attention component 166. Although teleconference space 160 is shown and described as comprising single visual component 162, single audio component 164, and single attention component 166, embodiments contemplate teleconference space 160 comprising any number of components or related information, according to particular needs.

Visual component 162 may comprise video imagery of one or more speaking users associated with one or more communication devices 122 and/or one or more communication systems 120. Audio component 164 may comprise audio from one or more currently-speaking users associated with one or more communication devices 122 and/or one or more communication systems 120. Attention component 166 may comprise information regarding the current level of attention of one or more users associated with each of one or more communication devices 122 and/or communication systems 120.

According to embodiments, cloud system 110 administrator 112 generates an outbound teleconference stream, comprising visual component 162 and/or audio component 164 of teleconference space 160. Administrator 112 transmits the outbound teleconference stream to each of one or more communication devices 122 participating in teleconference space 160. One or more communication devices 122 use associated audiovisual display devices to display the outbound teleconference stream. Each of one or more communication devices 122 uses an audiovisual recording device (such as, for example, a camera associated with communication device 122) to record the facial expression of one or more users associated with that communication device 122. In an embodiment, one or more communication devices 122 analyze each facial expression, assess its emotional content, and assign a qualitative value measuring one or more qualities of the facial expression in real time. One or more communication devices 122 may transmit this qualitative value of each of the one or more user facial expressions to one or more cloud systems 110 generating teleconference space 160.

Figure 2:
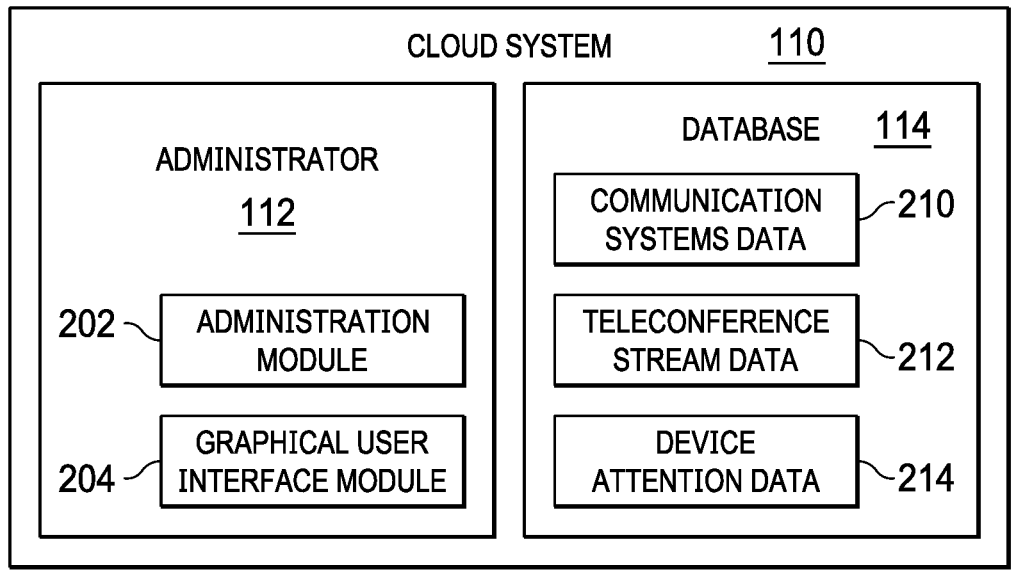
FIG. 2 illustrates the cloud system of FIG. 1 in greater detail, according to an embodiment.

FIG. 2 illustrates cloud system 110 of FIG. 1 in greater detail, according to an embodiment. Cloud system 110 may comprise one or more computers at one or more locations including associated input devices, output devices, non-transitory computer-readable storage media, processors, memory, or other components to send and receive information between one or more communication systems 120 and/or one or more communication devices 122 according to the operation of teleconference system 100. In addition, and as discussed in more detail below, cloud system 110 comprises administrator 112 and database 114. Although cloud system 110 is described as comprising single administrator 112 and single database 114, embodiments contemplate any suitable number of administrators 112 or databases 114 internal to or externally coupled with cloud system 110. In addition, or as an alternative, cloud system 110 may be located internal to one or more communication devices 122. For example, cloud system 110 may be located external to one or more communication devices 122 and may be located in, for example, a corporate or regional entity of one or more communication devices 122, according to particular needs.

According to embodiments, administrator 112 comprises administration module 202 and graphical user interface module 204. Although a particular configuration of administrator 112 is shown and described, embodiments contemplate any suitable number or combination of administration modules 202 and graphical user interface modules 204 located at one or more locations, local to, or remote from, cloud system 110, according to particular needs. In addition, or as an alternative, administration module 202 and graphical user interface module 204 may be located on multiple administrators 112 or computers at any location in teleconference system 100.

Database 114 may comprise communication systems data 210, teleconference stream data 212, and device attention data 214. Although database 114 is shown and described as comprising communication systems data 210, teleconference stream data 212, and device attention data 214, embodiments contemplate any suitable number or combination of communication systems data 210, teleconference stream data 212, device attention data 214, and/or other data pertaining to teleconference system 100 located at one or more locations, local to, or remote from, cloud system 110, according to particular needs.

Administration module 202 of administrator 112 may configure, update, and/or manage the operation of cloud system 110. That is, administration module 202 may configure, update, and/or manage the broader operation of teleconference system 100 and change which data is executed and/or stored on one or more cloud systems 110 and/or one or more communication devices 122. Teleconference system 100 may comprise a user-configurable system, such that cloud system 110 administrator 112 may store communication systems data 210, teleconference stream data 212, and/or device attention data 214 either singularly or redundantly in cloud system 110 database 114 and/or one or more communication devices 122, according to particular needs. According to other embodiments, administration module 202 monitors, processes, updates, creates, and stores communication systems data 210, teleconference stream data 212, and/or device attention data 214 in cloud system 110 database 114.

According to embodiments, administration module 202 of administrator 112 may generate teleconference space 160, which one or more communication devices 122 may join. When communication device 122 joins teleconference space 160, administration module 202 may record unique identifying information regarding communication device 122, such as by assigning communication device 122 a unique ID or by recording the IP or MAC address of communication device 122, in communication systems data 210 of database 114, as is further described below.

Graphical user interface module 204 of administrator 112 generates the outbound teleconference stream, which administration module 202 transmits to one or more communication devices 122 using network 130 and one or more communication links 140-150. Graphical user interface module 204 accesses teleconference stream data 212 stored in database 114 and uses teleconference stream data 212 to generate an outbound teleconference stream, which administration module 202 transmits to one or more communication devices 122 participating in teleconference space 160. Graphical user interface module 204 stores and retrieves data from cloud system 110 database 114, including communication systems data 210 and outbound teleconference stream data 212, in the process of generating the outbound teleconference stream. Graphical user interface module 204 may generate different graphical user interface displays conveying different types of information for different communication devices 122.

Communication systems data 210 of database 114 comprises the identification information of one or more communication devices 122, such as, for example, names and addresses of the one or more users associated with each of one or more communication devices 122, company contact information, telephone numbers, email addresses, IP addresses, and the like. According to embodiments, identification information may also comprise information regarding the operating systems of each of one or more communication systems 120, internet browser information regarding each of one or more communication devices 122 associated with each of one or more communication systems 120, or system specifications (such as, for example, processor speed, available memory, hard drive space, and the like) for each of one or more communication devices 122 associated with each of one or more communication systems 120.

Communication systems data 210 may also include end user ID information, end user personal identification number (PIN) information, communication device 122 ID information, communication device 122 MAC address information, or any other type of information which cloud system 110 may use to identify and track each of one or more communication systems 120 and/or one or more communication devices 122 participating in teleconference system 100. Communication systems data 210 may further comprise identification data that identifies and tracks each of one or more communication devices 122 which comprise each of one or more communication systems 120. Although particular communication systems data 210 are described, embodiments contemplate any type of communication systems data 210 associated with one or more communication devices 122 or communication devices 122, according to particular needs. In one embodiment, cloud system 110 uses communication systems data 210 to identify one or more participating communication devices 122 in teleconference system 100 in order to aid the selection of one or more communication device 122 streams to comprise the outbound teleconference stream, such as by prioritizing communication device 122 streams of predetermined very important person (VIP) communication devices 122. In another embodiment, cloud system 110 uses communication systems data 210 to generate teleconference space 160 which specifically includes only particular identified communication devices 122, such as in the case of a private teleconference space.

Teleconference stream data 212 of database 114 comprises data related to the outbound teleconference stream, which cloud system 110 transmits to one or more communication devices 122. One or more communication devices 122 may transmit audiovisual information regarding one or more speaking users to administration module 202, which may store this information in teleconference stream data 212. Graphical user interface module 204 may access teleconference stream data 212 and use it to generate an outbound teleconference stream, comprising a visual and audio component 164, which administration module 202 transmits to one or more communication devices 122 participating in teleconference space 160.

Device attention data 214 of database 114 comprises data related to the current attention status of the communication devices 122 participating in teleconference space 160. Each of one or more communication devices 122 participating in teleconference space 160 may analyze the facial expression of one or more associated users, assess the emotional content of each facial expression, and may use the emotional content of each facial expression to assign a qualitative value to the level of attention of each facial expression. According to embodiments, the qualitative attention value may be Boolean in nature (such as, for example, a binary selection between "attentive" or "inattentive"), or numerical in nature (such as, for example, by averaging together multiple assigned emotion scores to arrive at a percentage value, such as 75%).

Each of one or more communication devices 122 participating in teleconference space 160 may transmit a qualitative attention value for each facial expression to cloud system 110. Cloud system 110 administration module 202 may store the qualitative attention value of the one or more facial expressions associated with each communication device 122 in device attention data 214 of database 114. Graphical user interface module 204 may access device attention data 214 and use it and teleconference stream data 212 to generate specific graphical user interface displays.

According to embodiments, one or more communication devices 122 may transmit a request to administration module 202 of cloud system 110, using network 130 and communication links 140-150, for administration module 202 to generate teleconference space 160. In response, administration module 202 may generate teleconference space 160, and transmit requests to join teleconference space 160 to one or more other communication devices 122 using network 130 and communication links 140-150. A plurality of separate communication devices 122 may accept the requests and join and participate in teleconference space 160. Embodiments contemplate any number of communication devices 122 joining and participating in teleconference space 160.

In an embodiment, a user associated with one of one or more communication devices 122 uses teleconference space 160 to deliver a teleconference presentation to the users associated with the one or more separate communication devices 122 (the presenting user is henceforth referred to as the "host," and the particular communication device 122 associated with the host as the "host device"). The audiovisual recording device of the host device records audiovisual information regarding the host speaking. The host device transmits this audiovisual information to administration module 202 using network 130 and communication links 140-150. Administration module 202 stores this audiovisual information in teleconference stream data 212.

Graphical user interface module 204 accesses teleconference stream data 212, comprising visual component 162 and audio component 164 of the host's audiovisual information. Graphical user interface module 204 uses this data to generate an outbound teleconference stream, comprising visual component 162 displaying the host and audio component 164 comprising the host's spoken audio. Administration module 202 transmits the outbound teleconference stream to the communication devices 122 participating in teleconference space 160. Each of one or more communication devices 122 displays the audiovisual content of the outbound teleconference stream using one or more associated audiovisual display devices.

Figure 3:
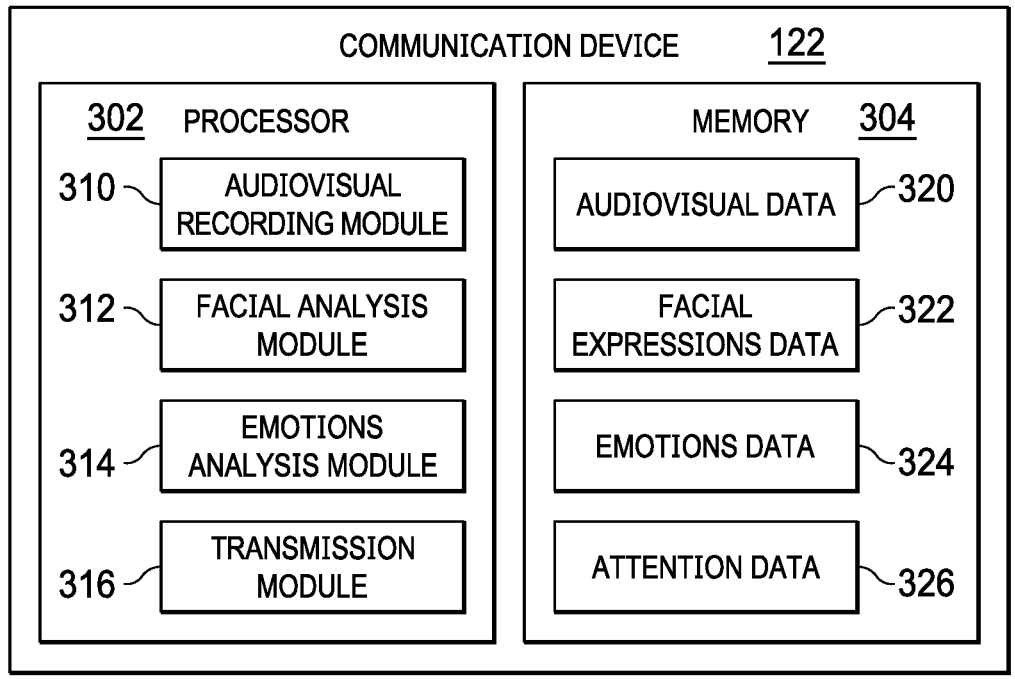
FIG. 3 illustrates an exemplary communication device of FIG. 1 in greater detail, according to an embodiment.

FIG. 3 illustrates exemplary communication device 122 of FIG. 1 in greater detail, according to an embodiment. Communication device 122 may comprise processor 302 and memory 304. Although communication device 122 is described as comprising single processor 302 and memory 304, embodiments contemplate any suitable number of processors 302, memory 304, or other data storage and retrieval components internal to or externally coupled with communication device 122.

Communication device 122 processor 302 may comprise audiovisual recording module 310, facial analysis module 312, emotions analysis module 314, and transmission module 316. Although processor 302 is illustrated as comprising single audiovisual recording module 310, facial analysis module 312, emotions analysis module 314, and transmission module 316, embodiments contemplate any suitable number of audiovisual recording modules 310, facial analysis modules 312, emotions analysis modules 314, transmission modules 316, or other modules, internal to or externally coupled with communication device 122. Processor 302 may execute an operating system program stored in memory 304 to control the overall operation of communication device 122. For example, processor 302 may control the reception of signals and the transmission of signals within teleconference system 100. Processor 302 may execute other processes and programs resident in memory 304, such as, for example, registration, identification or communication over network 130 and communication links 140-150.

Communication device 122 memory 304 may comprise audiovisual data 320, facial expressions data 322, emotions data 324, and attention data 326. Although memory 304 is described as comprising audiovisual data 320, facial expressions data 322, emotions data 324, and attention data 326, embodiments contemplate any suitable number of audiovisual data 320, facial expressions data 322, emotions data 324, attention data 326, or other data, internal to or externally coupled with communication device 122.

In an embodiment, audiovisual recording module 310 may be operatively associated with, and may monitor and facilitate the operation of, the audiovisual recording device of communication device 122. By way of example and not of limitation, audiovisual recording module 310 may activate the audiovisual recording device of a host's communication device 122, and may record audiovisual information regarding that host speaking to the one or more separate communication devices 122 participating in teleconference space 160. In an embodiment, audiovisual recording module 310 may transmit this audiovisual information to cloud system 110 administration module 202, using network 130 and one or more communication links 140-150.

Audiovisual recording module 310 may also store audiovisual information pertaining to one or more users in audiovisual data 320 of communication device 122 memory 304. According to embodiments, audiovisual data 320 may comprise visual information, such as a video file or real-time visual stream, or one or more individual image snapshots, of one or more users associated with communication device 122. Audiovisual data 320 may also comprise audio information, such as recorded audio of one or more speaking users. Although particular audiovisual data 320 are described herein, embodiments contemplate audiovisual recording module 310 storing any form of audiovisual data 320, including but not limited to data that is exclusively visual in nature or data that is exclusively audio in nature, in audiovisual data 320.

Facial analysis module 312 of communication device 122 processor 302 may analyze audiovisual data 320 to determine the facial expression of one or more users associated with communication device 122. Facial analysis module 312 may access audiovisual data 320, determine whether one or multiple users are currently associated with communication device 122, and may store information related to each of the one or more user facial expressions in facial expressions data 322. In an embodiment, facial analysis module 312 may use facial recognition techniques to separately identify each of the one or more users currently associated with communication device 122, and may separately store information related each user's facial expression in facial expressions data 322.

As discussed in greater detail below, facial analysis module 312 may determine the status of each user's facial expression by, for example: (1) assigning one or more data points 702, illustrated by FIG. 7, to the facial structure of individual snapshots or a real-time visual stream of a user stored in audiovisual data 320, and (2) interpreting assigned data points 702 in accordance with one or more facial expression templates which may be stored in facial expressions data 322. Although particular procedures by which facial analysis module 312 may analyze user facial expression information and store such information in facial expressions data 322 are shown and described, embodiments contemplate facial analysis module 312 utilizing any analysis technique to review information stored in audiovisual data 320 and to convert the audiovisual data 320 information into facial expressions information stored in facial expressions data 322, according to embodiments.

Facial expressions data 322 of communication device 122 memory 304 stores information regarding the current facial expression of each of the one or more users associated with communication device 122, according to an embodiment. Facial expressions data 322 may further comprise one or more facial expression templates, which facial analysis module 312 may use to interpret data points 702 which facial analysis module 312 has assigned to the facial structure of each user. In an embodiment, one or more cloud systems 110 and/or one or more communication devices 122 may transmit one or more facial expression templates to facial expressions data 322.

Facial analysis module 312 may analyze each of the one or more users' facial expressions stored in facial expressions data 322, utilizing one or more facial expression templates also stored in facial expressions data 322, to interpret the presence of one or more emotions associated with each user's facial expressions. For example, facial analysis module 312 may analyze a particular user's facial expressions for the presence of specific assigned data points 702 which suggest the user is happy (such as, for example, by determining that a cluster of assigned data points 702 around the user's mouth suggest the user is smiling), sad, surprised, neutral, angry, or unfocused. Although particular exemplary emotions are described herein, embodiments contemplate facial analysis module 312 analyzing a user's facial expression to detect the presence of one or more of any possible emotions, according to embodiments. Having assessed the presence of one or more emotions in the user's facial expression, facial analysis module 312 stores this emotion information in emotions data 324 of communication device 122 memory 304.

According to embodiments, emotions data 324 of communication device 122 memory 304 stores information regarding one or more emotions associated with each of the one or more users' facial expression. In an embodiment, emotions data 324 may store separate variables for one or more of any possible emotions, assigned by facial analysis module 312. By way of example and not of limitation, facial analysis module 312 may analyze a particular user facial expression stored in facial expressions data 322 and assign separate emotion scores representing a plurality of separate emotions (in this example: happy 78%; sad 21%; surprised 44%; neutral 0%; angry, 5%; unfocused 10%). Facial analysis module 312 may store each separate emotion scores in emotions data 324. Although particular exemplary emotions and emotion scores are shown and described, embodiments contemplate emotions data 324 storing score information regarding any number of separate defined emotions, according to particular needs.

Emotions analysis module 314 of communication device 122 processor 302 may access data regarding emotions and emotion scores stored in emotions data 324, and may use the data regarding emotions and emotion scores to assign a qualitative attention value indicating whether each particular user of the one or more users associated with communication device 122 is attentive to and following teleconference space 160. Emotions analysis module 314 may utilize one or more attention criteria, stored in attention data 326, to assign the qualitative attention value. For example, an exemplary attention criteria might specify that if a user's assessed happiness emotion is greater than 50%, and the user's assessed unfocused emotion is also less than 30%, that user is engaged and is attentively participating in teleconference space 160. Although specific attention criteria are described, embodiments contemplate the emotional analysis module utilizing any attention criteria to analyze the emotions and emotion scores stored in emotions data 324 in order to assign a qualitative attention value. In an embodiment, one or more cloud systems 110 or one or more separate communication devices 122 may transmit information to emotions analysis module 314, using network 130 and communication links 140-150, directing which attention criteria emotions analysis module 314 should use to assign a qualitative attention value. Having assigned a qualitative attention value, emotions analysis module 314 stores the qualitative attention value in attention data 326 of communication device 122 memory 304.

According to embodiments, attention data 326 may store an assigned qualitative attention value of each of the one or more users' attentiveness to and engagement in teleconference space 160. Attention data 326 may also store one or more attention criteria, which may be transmitted to communication device 122 by one or more cloud systems 110 and/or one or more separate communication devices 122, and which emotions analysis module 314 may use to generate a qualitative attention value based on emotions data 324 and the emotion scores stored in emotions data 324 of communication device 122 memory 304. Although particular examples of attention data 326 are described herein, embodiments contemplate attention data 326 comprising any number or type of attention criteria or qualitative attention values, according to particular needs.

Transmission module 316 of communication device 122 processor 302 may access the qualitative attention values, stored in attention data 326, of each of the one or more users associated with communication device 122. Transmission module 316 may transmit the qualitative attention values to cloud system 110 administration module 202 using network 130 and communication links 140-150. In an embodiment, transmission module 316 may transmit a qualitative attention value for each of the one or more users associated with the communication system 120 to cloud system 110 administration module 202 every two seconds, permitting administration module 202 to receive substantially real-time updates regarding the emotions and attention level of each user participating in teleconference space 160. That is, audiovisual recording module 310, facial analysis module 312, emotions analysis module 314, and transmission module 316 may continuously carry out and update the actions described above to generate and continuously update a qualitative attention value for each particular user, and to transmit this qualitative attention value to administration module 202 of cloud system 110 every two seconds. In other embodiments, audiovisual recording module 310, facial analysis module 312, emotions analysis module 314, and transmission module 316 may generate and transmit a qualitative attention value for a particular user every second, every ten seconds, or at any other interval of time.

Administration module 202 may store the qualitative attention value of each of the one or more users associated with each communication device 122 participating in teleconference space 160 in device attention data 214 of cloud system 110 database 114. According to embodiments, and separate from the outbound teleconference stream described above, graphical user interface module 204 may access device attention data 214 and use it to generate attention component 166 of teleconference space 160. Attention component 166 may display the current status of the qualitative attention value of each communication device 122 participating in teleconference space 160. In an embodiment, administration module 202 may transmit attention component 166 exclusively to the host device. The host device may use its audiovisual display device to display attention component 166 to the host, who may use attention component 166 information to alter the ongoing presentation delivered using teleconference space 160.

Figure 4:
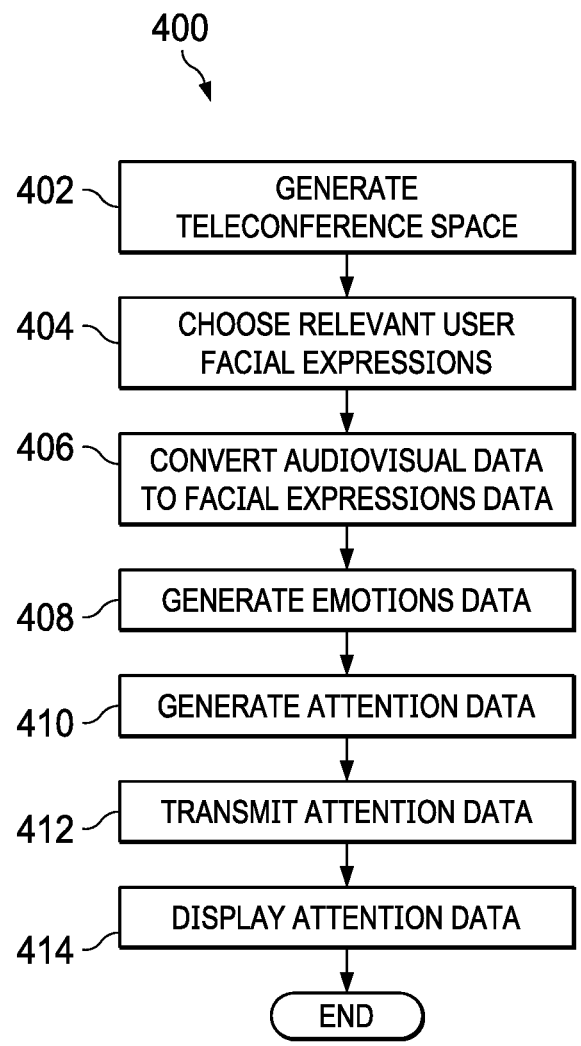
FIG. 4 illustrates an exemplary method of displaying the qualitative attention values of one or more communication devices, according to an embodiment.

FIG. 4 illustrates exemplary method 400 of displaying the qualitative attention values of one or more communication devices 122, according to an embodiment. Method 400 proceeds by one or more actions, which although described in a particular order may be performed in one or more permutations or alternative orders, according to particular needs.

At action 402 of method 400, teleconference system 100 generates teleconference space 160. Communication device 122 transmits a request to administration module 202, using network 130 and communication links 140-150, to generate teleconference space 160. Administration module 202 generates teleconference space 160 and transmits, using network 130, requests to join teleconference space 160 to one or more separate communication devices 122 that will participate in teleconference space. Each of the one or more separate communication devices 122 accepts the request to join teleconference space 160 and transmits acceptance to administration module 202. Administration module 202 records unique identifying information regarding each of the one or more communication devices 122, such as by assigning each communication device 122 a unique ID and/or by recording IP or MAC address of each communication device 122 in communication systems data 210. In an embodiment, communication device 122 that transmitted the initial request to generate teleconference space 160 to administration module 202 uses teleconference space 160 to deliver a teleconference presentation to one or more separate communication devices 122 that joined teleconference space 160. Communication device 122 that transmitted the initial request to generate teleconference space 160 to administration module 202 is henceforth referred to as the "host device," and the user associated with the host device is referred to as the "host."

Continuing action 402, the audiovisual recording device of the host device records audiovisual information regarding the host speaking in the form of visual component 162 and audio component 164. The host device transmits visual component 162 and audio component 164 to administration module 202 using network 130 and communication links 140-150. Administration module 202 stores visual component 162 and audio component 164 in teleconference stream data 212. Graphical user interface module 204 accesses teleconference stream data 212, which comprises visual component 162 and audio component 164 of the host's audiovisual information. Graphical user interface module 204 uses visual component 162 and audio component 164 to generate an outbound teleconference stream, comprising visual component 162 displaying the host and audio component 164 comprising the host's spoken audio. Administration module 202 transmits the outbound teleconference stream to one or more communication device 122 participating in teleconference space 160. Each of one or more communication devices 122 displays the audiovisual content of the outbound teleconference stream as teleconference display 602, illustrated by FIG. 6, displayed on an associated audiovisual display device of each communication device 122.

At action 404, teleconference system 100 chooses relevant user facial expressions. In an embodiment, the host device selects one or more relevant user facial expressions by which to measure user attention. Embodiments contemplate host devices selecting any number of user facial expressions or emotions to measure user attention, according to particular needs. The host device transmits the host's selection of one or more relevant user facial expressions by which to measure user attention to administration module 202. Administration module 202 transmits the host device's selection of one or more relevant user facial expressions by which to measure user attention to each of one or more communication devices 122 participating in teleconference space 160. Each communication device 122 stores the selection of one or more relevant user facial expressions by which to measure user attention in communication device 122 facial expressions data 322.

At action 406, each communication device 122 participating in teleconference space 160 converts audiovisual data 320 pertaining to one or more users associated with each communication device 122 into facial expressions data 322. Audiovisual recording module 310 of each communication device 122 activates the associated audiovisual recording device of each communication device 122 and captures at least visual information, such as but not limited to a real-time visual stream and/or individual visual snapshots, of a user associated with communication device 122. Audiovisual recording module 310 stores the visual information in audiovisual data 320. Communication device 122 facial analysis module 312 accesses audiovisual data 320 and uses audiovisual data 320 to generate facial expression data 322 pertaining to one or more facial expressions of one or more associated users. In an embodiment, to generate facial expression data 322, facial analysis module 312 (1) assigns data points 702 to the facial structure of individual snapshots and/or a real-time visual stream of a user stored in audiovisual data 320, and (2) interprets assigned data points 702 in accordance with one or more facial expression templates stored in facial expression data 322.

At action 408, teleconference system 100 generates emotions data 324. In an embodiment, facial analysis module 312 accesses facial expressions data 322 and interprets the presence of one or more emotions associated with the one or more user facial expressions stored in facial expressions data 322. Facial analysis module 312 may compare facial expressions with one or more facial expression templates, stored in facial expressions data 322, to interpolate emotions associated with one or more facial expressions and to store the one or more emotions in emotions data 324. Other embodiments contemplate facial analysis module 312 utilizing any method to analyze facial expressions data 322 and to assign emotions data 324 based on facial expressions data 322, according to particular needs.

At action 410, teleconference system 100 generates attention data 326 from emotions data 324. In an embodiment, emotions analysis module 314 accesses emotions data 324 and assigns attention data 326, in the form of a qualitative attention value, to the emotion scores stored in emotions data 324. According to embodiments, emotions analysis module 314 may use any process, including but not limited to combining one or more emotion scores assigned to emotions data 342 into a single Boolean value (such as, for example, "attentive" or "inattentive"), to generate a qualitative attention value. Emotions analysis module 314 stores the qualitative attention value in attention data 326.

At action 412, communication device 122 transmission module 316 transmits attention data 326 to administration module 202 of cloud system 110. Administration module 202 receives, from each communication device 122 participating in teleconference space 160, attention data 326 regarding the one or more users associated with each communication device 122. Administration module 202 stores attention data 326 from each communication device 122 in device attention data 214 of cloud system 110 database 114. According to embodiments, each communication device 122 may execute actions 406-412 of method 400—that is, converting audiovisual data 320 to facial expressions data 322, generating emotions data 324 based on facial expressions data 322, generating attention data 326 based on emotions data 324, and transmitting attention data 326 to administration module 202—once every second, once every two seconds, once every ten seconds, substantially continuously, or at any other interval of time. By way of example only and not by way of limitation, in embodiments in which each communication device 122 executes actions 406-412 once every two seconds, administration module 202 receives a nearly-continuous update from each communication device 122 regarding the current attention data 326 and the qualitative attention value of the one or more users associated with each communication device 122.

At action 414, graphical user interface module 204 displays attention data 326 from each communication device 112 to the host device. In an embodiment, graphical user interface module 204 accesses device attention data 214 and the qualitative attention value of each communication device 122 participating in teleconference space 160. Graphical user interface module 204 uses device attention data 214, as well as visual component 162 of the outbound teleconference stream stored in teleconference stream data 212, to generate attention component 166 of teleconference space 160. Attention component 166 displays the current status of the qualitative attention value of each communication device 122 participating in teleconference space 160. In an embodiment, the host device uses its associated audiovisual display device to display attention component 166 to the host as a component of host display 1002, illustrated by FIG. 10. Teleconference system 100 terminates method 400 when the host teleconference concludes.

In order to illustrate the operation of method 400 and teleconference system 100 displaying the qualitative attention values of one or more communication devices 122, an example is now provided. In the following example, exemplary teleconference system 100 comprises cloud system 110, five communication devices 122 (in this example, computers 502-510, each of which comprises a single associated user), network 130, and six communication links 140-149. Although a particular number of cloud systems 110, communication devices 122, networks 130, and communication links 140-149 are shown and described, embodiments contemplate any number of cloud systems 110, communication devices 122, networks 130, or communication links 140-149, according to particular needs.

Figure 5:
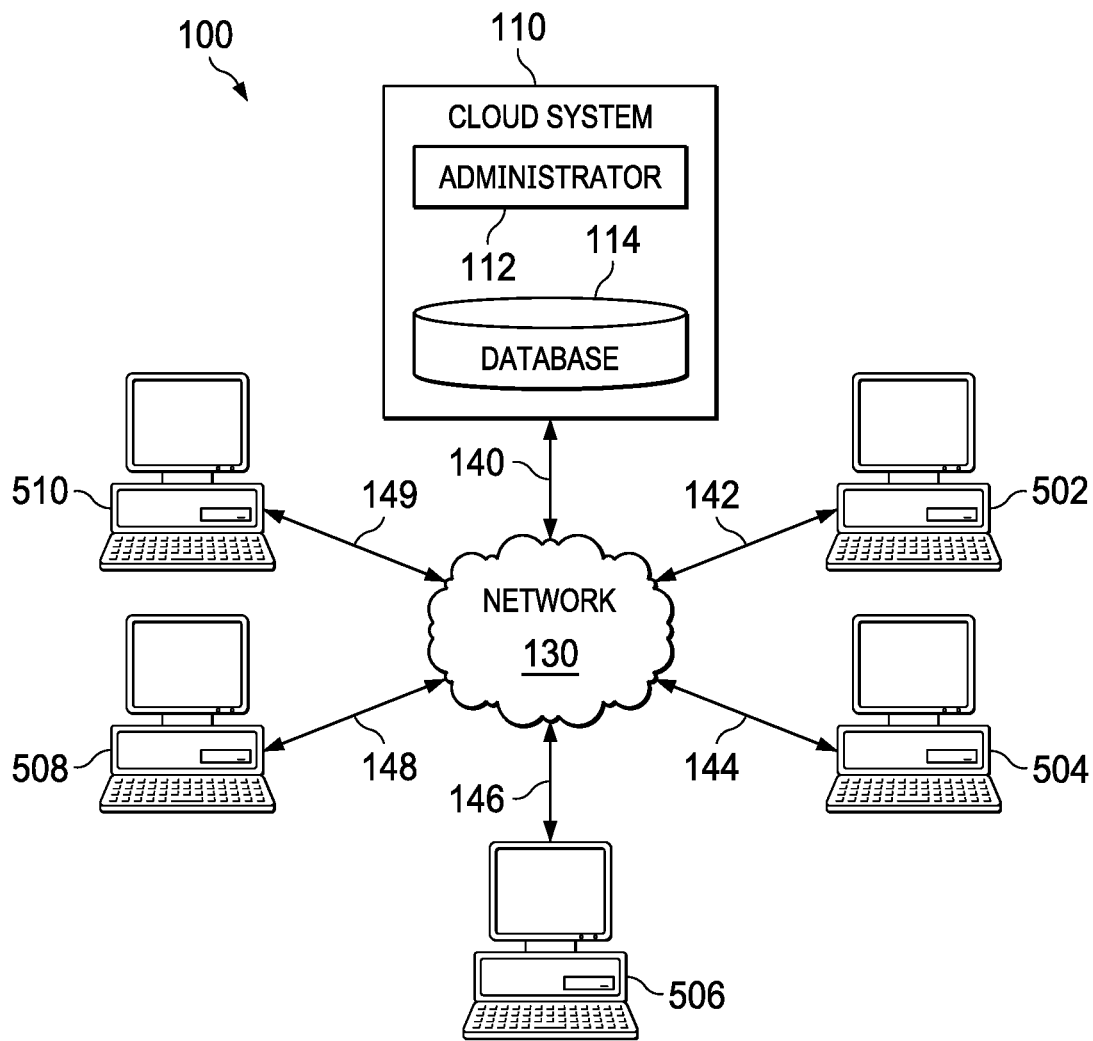
FIG. 5 illustrates an exemplary teleconference system executing the method of FIG. 4, according to an embodiment.

FIG. 5 illustrates exemplary teleconference system 100 executing method 400 of FIG. 4, according to an embodiment. Continuing with the example, each of computers 502-510 comprises an audiovisual recording device (comprising a camera and microphone), an audiovisual display device (comprising an electronic display screen and one or more speakers), and an input device (comprising a keyboard). In this example, computer 502 acts as the host device (henceforth referred to as "host computer 502") to conduct the teleconference presentation and to deliver the teleconference presentation to the other four computers 504-510.

Continuing the example, at action 402 of method 400, host computer 502 transmits a request to administration module 202, using network 130 and communication links 140-150, to generate teleconference space 160. Administration module 202 generates teleconference space 160 and transmits, using network 130, requests to join teleconference space 160 to each of computers 504-510. Each of computers 504-510 transmits acceptance of the request to join teleconference space 160 to administration module 202. Administration module 202 records unique identifying information regarding each of computers 504-510, in this example by assigning to each of computers 504-510 a unique ID and by recording the IP or MAC address of each of computers 504-510, in communication systems data 210.

Continuing the example, and continuing action 402, the audiovisual recording device of host computer 502 records audiovisual information, in this example comprising visual component 162 and audio component 164, of the host speaking and delivering a presentation. Host computer 502 transmits host audiovisual information, including visual component 162 and audio component 164, to administration module 202 using network 130 and communication links 140-142. Administration module 202 stores the audiovisual information, including visual component 162 and audio component 164, in teleconference stream data 212. Graphical user interface module 204 accesses teleconference stream data 212, which comprises visual component 162 and audio component 164 of the host's audiovisual information. Graphical user interface module 204 uses teleconference stream data 212 to generate an outbound teleconference stream, comprising visual component 162 displaying the host and audio component 164 comprising the host's spoken audio, which administration module 202 transmits to computers 504-510 participating in teleconference space 160. Each of computers 504-510 displays the audiovisual content of the outbound teleconference stream as teleconference display 602 on the associated audiovisual display device.

Figure 6:
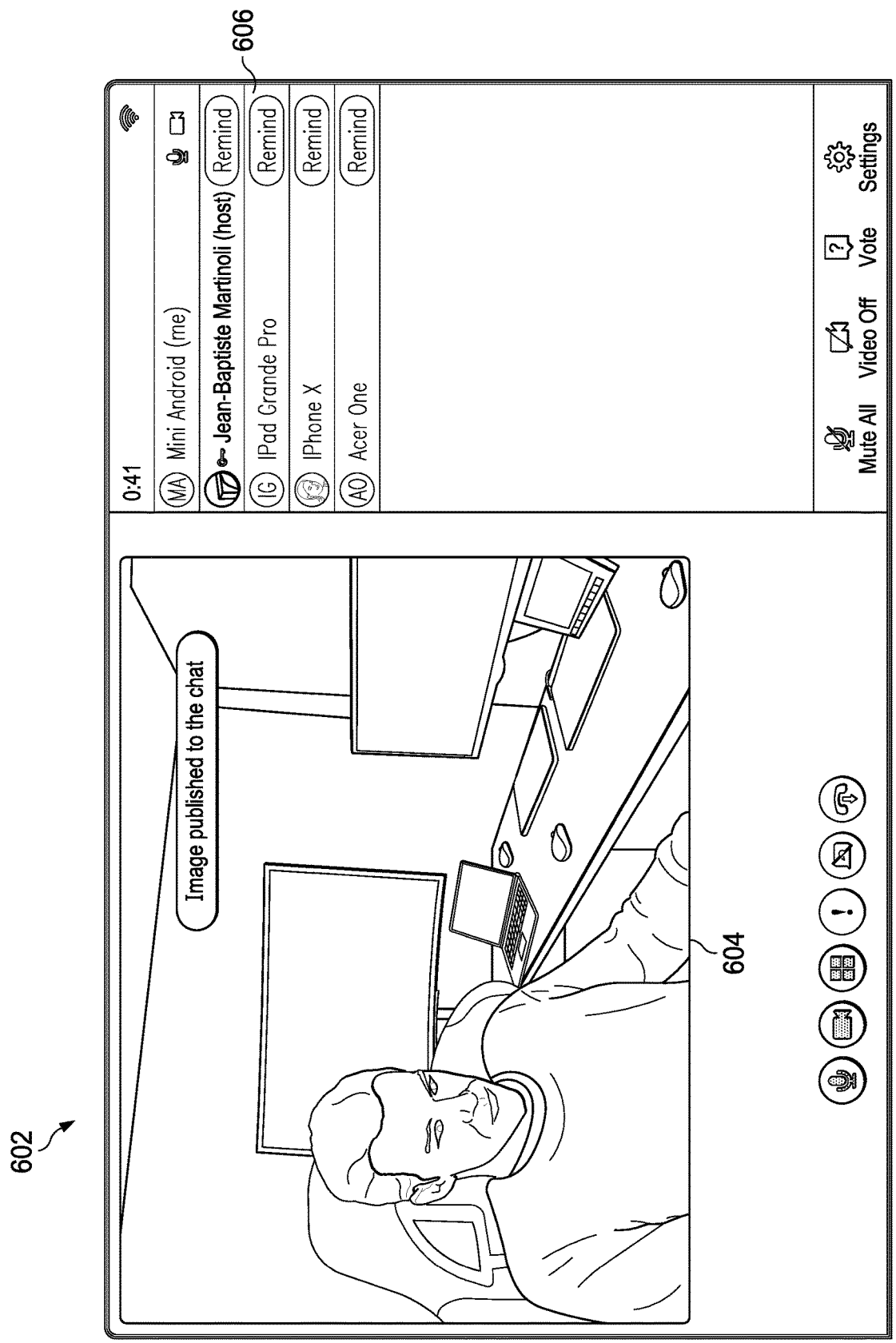
FIG. 6 illustrates a teleconference display, according to an embodiment.

FIG. 6 illustrates teleconference display 602, according to an embodiment. In an embodiment, teleconference display 602 displays the outbound teleconference stream, comprising visual component 162 and audio component 164, transmitted by administration module 202 to each of computers 504-510. Continuing the example, teleconference display 602 comprises presentation window 604 and participant panel 606. Presentation window 604, occupying a large area of the central portion of teleconference display 602 illustrated in FIG. 6, displays visual component 162 of the outbound teleconference stream, in the form of video imagery of the host giving the presentation. Although a particular configuration of presentation window 604 is shown and described, embodiments contemplate teleconference displays 602 displaying presentation windows 604 and/or outbound teleconference stream visual components 162 in any configuration, according to particular needs.

According to embodiments, participant panel 606 on the right side of teleconference display 602 displays a visual representation of communication devices 122 currently participating in teleconference space 160. Participant panel 606 may identify participating communication devices 122 (in this example, computers 502-510) by the names of the users associated with communication devices 122, or by identifying communication devices 122 themselves (such as "Mini Android," "Acer One," and the like). In an embodiment, administration module 202 may assign names to communication devices 122 displayed in participant panel 606 using information contained in communication systems data 210. Continuing the example, participant panel 606 of exemplary teleconference stream 602 lists computers 502-510. Although a specific configuration of participant panel 606 is shown and described, embodiments contemplate teleconference displays 602 displaying participant panels in any configuration, according to particular needs.

Continuing the example, at action 404, host computer 502 selects "happy" as the relevant user facial expression by which to measure user attention. Although in this example host computer 502 selects a single user facial expression by which to measure user attention, embodiments contemplate hosts and/or host devices selecting any other user facial expressions, emotions, or any number of user facial expressions or emotions to measure, according to various needs. Host computer 502 transmits the host's selection of "happy"

as the relevant user facial expression to administration module 202, which transmits the selection to each of computers 502-510 participating in teleconference space 160. Each of computers 502-510 stores the selection of "happy" as the relevant user facial expression in facial expression data 322.

Continuing the example, at action 406, each of computers 504-510 converts audiovisual data 320 pertaining to an associated user into facial expressions data 322. To accomplish this, the audiovisual recording module 310 of each of computers 504-510 uses the associated audiovisual recording device to capture visual information, in the form of a real-time visual stream, the associated user. Audiovisual recording module 310 stores the real-time visual stream in audiovisual data 320. Facial analysis module 312 analyzes the real-time visual stream, stored in audiovisual data 320, to generate facial expressions data 322. In this example, facial analysis module 312 analyzes the real-time visual stream by assigning seventy-one data points 702 to the facial structure of the user recorded in the real-time visual stream, illustrated by FIG. 7.

Figure 7:
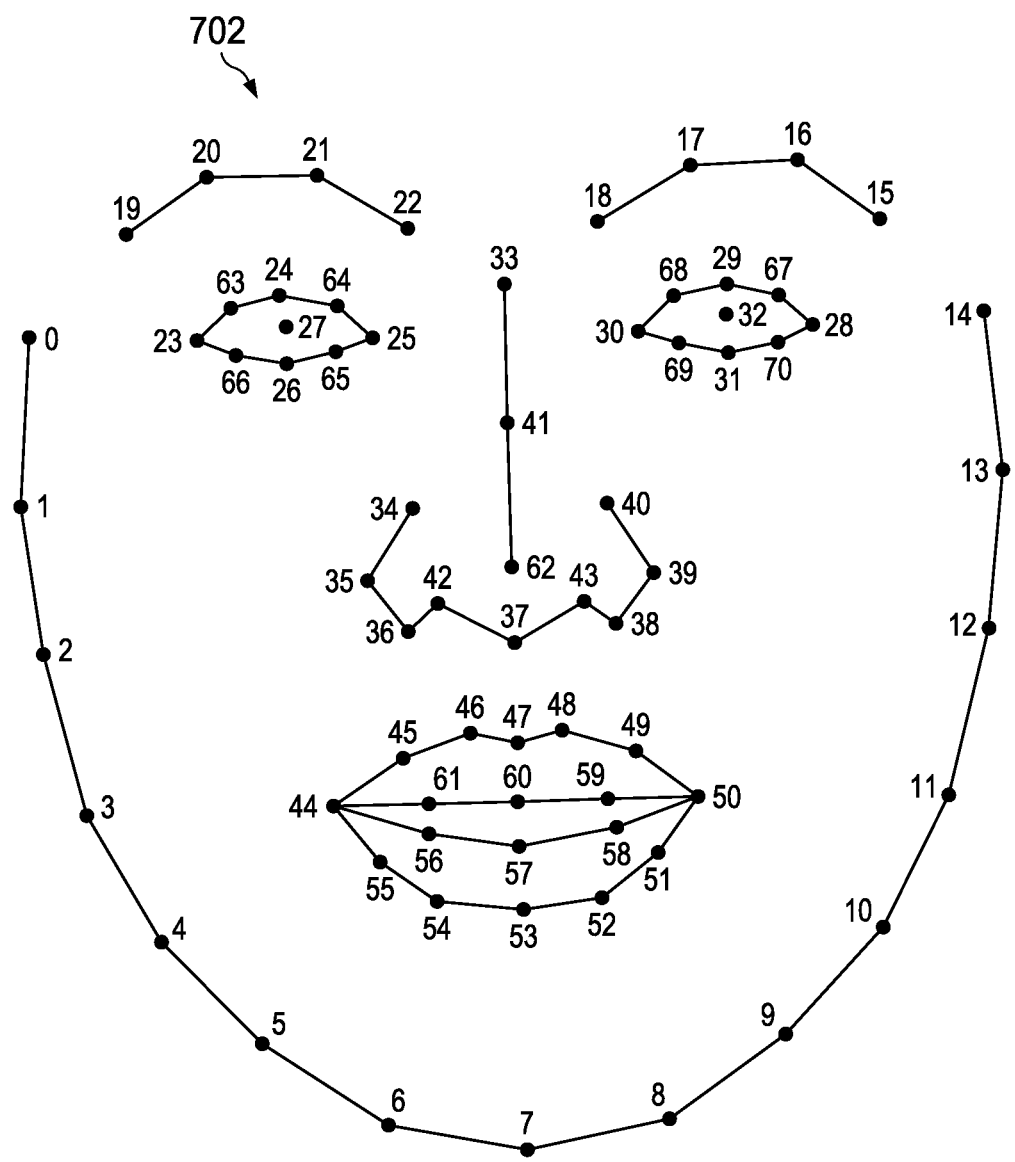
FIG. 7 illustrates data points assigned by a facial analysis module to a real-time visual stream, according to an embodiment.

FIG. 7 illustrates data points 702 assigned by facial analysis module 312 to the real-time visual stream, according to an embodiment. Continuing the example, facial analysis module 312 assigns seventy-one data points 702 to locate and track facial structure features of the user recorded in the real-time visual stream. Although this example illustrates facial analysis module 312 assigning seventy-one data points 702 to audiovisual data 320 comprising a user's face, embodiments contemplate facial analysis module 312 assigning any number of points to audiovisual data 320 or using any other method to analyze audiovisual data 320 in order to generate facial expressions data 322. Continuing the example, facial analysis module 312 stores the assigned seventy-one facial expression data points 702, which convey data regarding the current facial expression of the user, in facial expressions data 322.

Continuing the example, at action 408, facial analysis module 312 generates emotions data 324 from facial expressions data 322. Facial analysis module 312 accesses facial expressions data 322 and interprets the presence of one or more emotions associated with the facial expression stored in facial expressions data 322. In this example, facial analysis module 312 compares facial expressions stored in facial expressions data 322 to facial expression templates, also stored as data in facial expressions data 322, to generate emotions data 324. Other embodiments contemplate facial analysis module 312 utilizing any method to analyze facial expressions data 322 and to assign emotions data 324 based on facial expressions data 322, according to particular needs.

Figure 8:
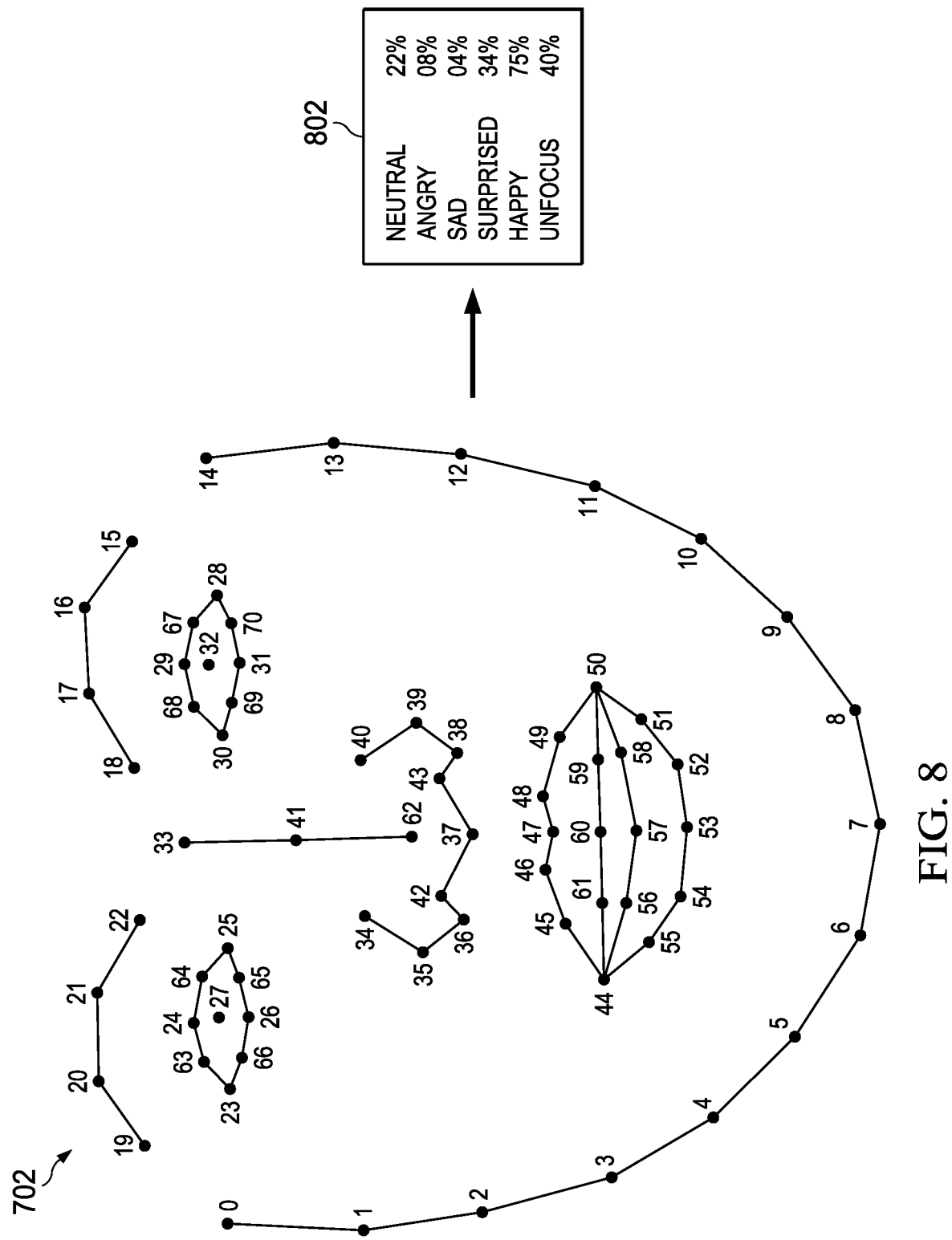
FIG. 8 illustrates the process by which the facial analysis module generates emotions data based on facial structure data points stored in facial expressions data, according to an embodiment.

FIG. 8 illustrates the process by which facial analysis module 312 generates emotions data 324 based on the facial structure data points 702 stored in facial expressions data 322, according to an embodiment. FIG. 8 comprises data points 702 and emotions data box 802, according to an embodiment. Although FIG. 8 illustrates a particular configuration of data points 702 and emotions data box 802, embodiments contemplate any configuration of these, according to particular needs.

Continuing the example, facial analysis module 312 analyzes facial structure data points 702 stored in facial expressions data 322 and compares data points 702 to facial expression templates, also stored in facial expressions data 322, to interpret the presence of one or more emotions. As illustrated in FIG. 8, facial analysis module 312 in this example interprets the presence and relative strength of the following six emotions data box 802 emotions and assigns the following six emotional scores: happy 75%; sad 4%; surprised 34%; neutral 22%; angry, 8%; unfocused 40%. The facial analysis stores these six emotional scores displayed by emotions data box 802 in emotions data 324.

Continuing the example, at action 410, emotions analysis module 314 accesses emotions data 324 and assigns attention data 326, in the form of a qualitative attention value, to the emotion scores stored in emotions data 324.

Figure 9:
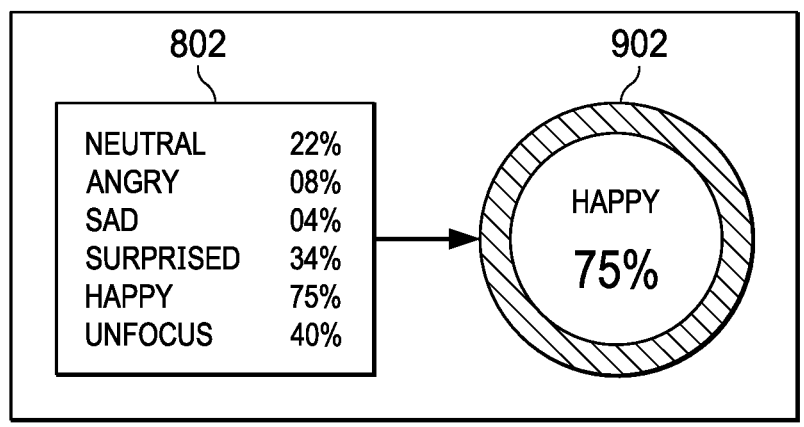
FIG. 9 illustrates the process by which an emotions analysis module generates attention data from emotions data, according to an embodiment.

FIG. 9 illustrates the process by which emotions analysis module 314 generates attention data 326 from emotions data 324, according to an embodiment. FIG. 9 comprises emotions data box 802 and attention display 902, according to an embodiment. Although FIG. 9 illustrates a particular configuration of emotions data box 802 and attention display 902, embodiments contemplate any configuration of these, according to particular needs.

Continuing the example, emotions analysis module 314 accesses the emotion scores stored in emotions data 324 emotions data box 802, and compares the emotion scores to the relevant user facial expression selected at action 404. In this example, the host selected "happy" as the relevant user facial expression. Consequently, emotions analysis module 314 selects the "happy" emotion score of 75%, and saves the happy emotion score as a qualitative attention value in attention data 326. In an embodiment, graphical user interface module 204 displays the happy emotions score as a qualitative attention value in the form of attention display 902. In other embodiments, emotions analysis module 314 may store a Boolean value (such as, for example, "happy" or "unhappy" with regard to the happiness emotion score) in attention data 326, and/or may combine several emotion scores into a single Boolean value (such as, for example, "attentive" or "inattentive") based on an average of several emotion scores.

Continuing the example, at action 412, transmission module 316 of each of computers 504-510 transmits attention data 326 pertaining to the user associated with each computer 504-510 to administration module 202 of cloud system 110. Administration module 202 receives, from each computer 504-510 participating in teleconference space 160, attention data 326 regarding the user associated with each computer 504-510. Administration module 202 stores attention data 326 from each computer 504-510 in device attention data 214 of cloud system 110 database 114. In this example, each computer 504-510 executes actions 406-412 of method 400 (that is, converting audiovisual data 320 to facial expressions data 322, generating emotions data 324 based on facial expressions data 322, generating attention data 326 based on emotions data 324, and transmitting attention data 326 to administration module 202) once every two seconds. In this way, administration module 202 receives a nearly-continuous update from each computer 504-510 regarding the current attention data 326 and the qualitative attention value of the user associated with each computer 504-510. In other embodiments, each of one or more communication devices 122 participating in teleconference space 160 may execute actions 406-412 of method 400 once every second, once every ten seconds, substantially continuously, or at any other interval of time.

Continuing the example, at action 414, graphical user interface module 204 displays attention data 326 from each computer 504-510 to host computer 502. In an embodiment, graphical user interface module 204 accesses device attention data 214 and the current attention data 326 of each computer 504-510 stored therein. Graphical user interface module 204 uses attention data 326, as well as visual component 162 of the outbound teleconference stream stored in teleconference stream data 212, to generate attention component 166 of teleconference space 160. Attention component 166 displays the current status of the qualitative attention value of each computer 504-510 participating in teleconference space 160. In an embodiment, graphical user interface module 204 may display attention component 166 in the form of host display 1002 attention readout 1004, illustrated by FIG. 10.

Figure 10:
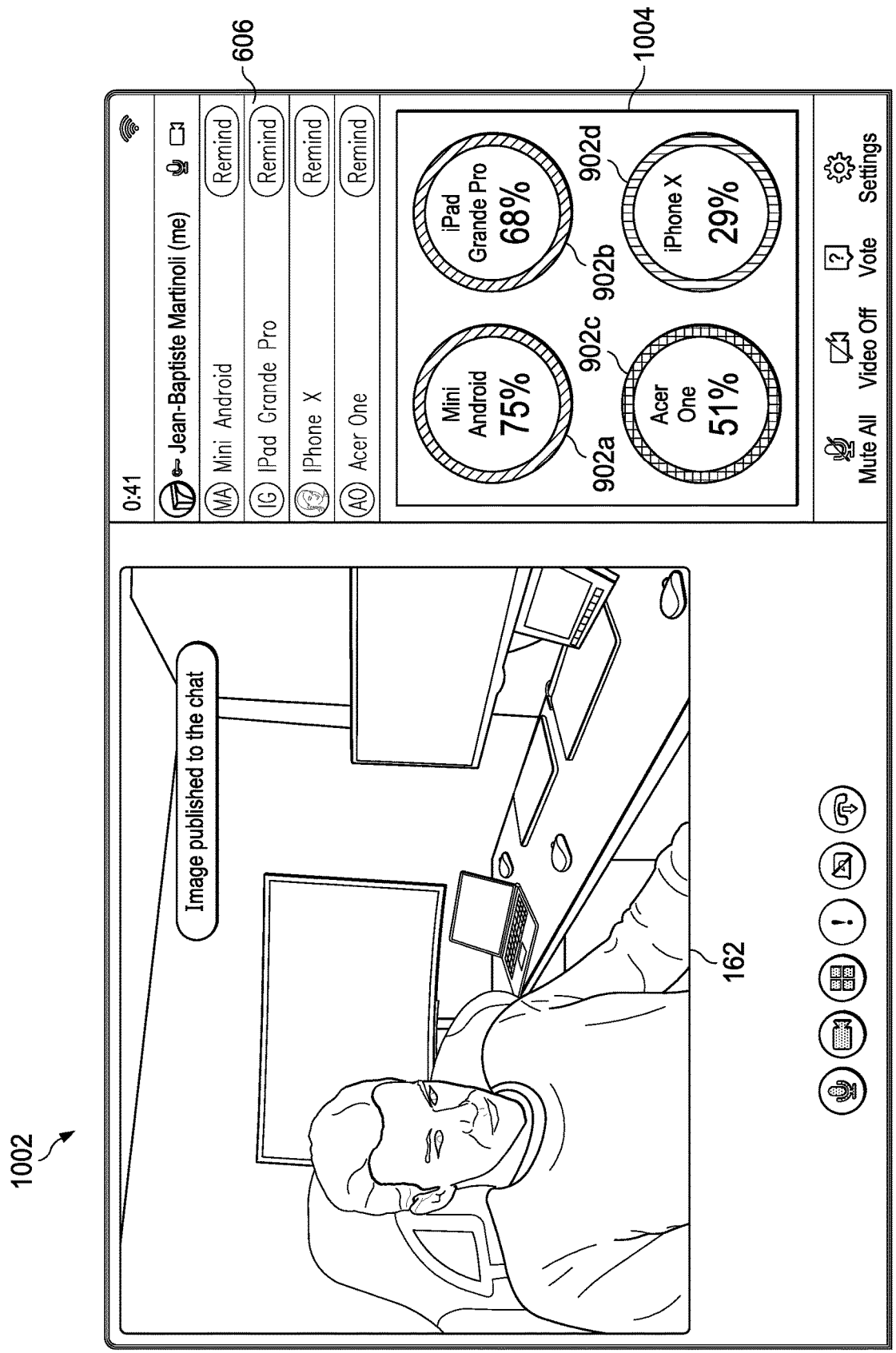
FIG. 10 illustrates a host display of a teleconference space, according to an embodiment.

FIG. 10 illustrates host display 1002 of teleconference space 160, according to an embodiment. As illustrated by FIG. 10, host display 1002 comprises visual component 162 of the outbound teleconference stream, attention readout 1004, and participant panel 606. Although FIG. 10 illustrates a particular configuration of host display 1002, attention readout 1004, and participant panel 606, embodiments contemplate any configuration of these, according to particular needs.

Continuing the example, host display 1002 comprises visual component 162 of the outbound teleconference stream, and additionally displays attention component 166 in the form of attention readout 1004. Attention readout 1004 displays the current qualitative attention value of each computer of computers 504-510 in the form of attention displays 902a-902d (wherein, in this example, attention display 902a corresponds to the current qualitative attention value of computer 504, attention display 902b corresponds to the current qualitative attention value of computer 506, attention display 902c corresponds to the current qualitative attention value of computer 508, and attention display 902d corresponds to the current qualitative attention value of computer 510). In this embodiment, attention readout 1004 displays the qualitative attention value of each computer 504-510 expressed as a percentage value. Other embodiments contemplate attention component 166 and/or attention readout 1004 displaying communication device 122 qualitative attention value in any form (such as, for example, as a Boolean "happy" or "unhappy") and in any visual configuration, according to particular needs.

Continuing the example, and according to embodiments, administration module 202 may transmit host display 1002 and/or attention readout 1004 exclusively to host computer 502. Host computer 502 may use an associated audiovisual display device to display host display 1002 and/or attention readout 1004 to the host, who may use attention component 1004, and more specifically attention displays 902a-902d displayed therein, to alter the ongoing presentation delivered using teleconference space 160. Teleconference system 100 provides the host with nearly real-time updates as to the current emotional status of a user associated with each participating communication device 122, and provides feedback on the host's presentation through teleconference space 160. Concluding the example, teleconference system 100 terminates method 400 when the host teleconference concludes.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
two or more communication devices; and
a computer coupled with a database and comprising a processor and memory, the computer configured to generate a teleconference space in which the two or more communication devices participate by:
generating a teleconference space;
transmitting requests to join the teleconference space to the two or more communication devices;
storing in the computer memory identification information for each of the two or more communication devices;
storing audiovisual data pertaining to one or more users associated with each of the two or more communication devices;
generating attention data from the audiovisual data based, at least in part, on an interpolation of facial structure data of the one or more users with one or more facial expression templates;
transmitting the attention data from each of the two or more communication devices to the computer;
transmitting teleconference data and the attention data from the computer to each of the two or more communication devices; and
displaying the attention data on each of the two or more communication devices, wherein the attention data is displayed as a plurality of values, wherein each value of the plurality of values corresponds to each of other communication devices participating in the teleconference space.

2. The system of claim 1, wherein the teleconference data is one or more selected from a group consisting of: a video file, a real-time visual stream, one or more individual image snapshots and audio information.

3. The system of claim 1, further comprising the system comparing facial expressions data with one or more facial expression templates to interpolate emotions associated with one or more facial expressions.

4. The system of claim 1, wherein the identification information comprises:
end user ID information, end user personal identification number (PIN) information, communication device ID information or communication device MAC address information.

5. The system of claim 1, further comprising the system prioritizing the teleconference data transmitted to one or more predetermined communication devices based on the identification information.

6. The system of claim 1, further comprising displaying on each of the two or more communication devices a participant panel identifying participating communication devices by names of users associated with the participating communication devices or according to a corresponding type of communication device.

7. The system of claim 1, wherein the computer and the database comprises one or more cloud systems.

8. A computer-implemented method, comprising:
generating, using a computer coupled with a database and comprising a processor and memory, a teleconference space in which two or more communication devices participate;
transmitting requests to join the teleconference space to the two or more communication devices;
storing in the computer memory identification information for each of the two or more communication devices;

storing audiovisual data pertaining to one or more users associated with each of the two or more communication devices;

generating attention data from the audiovisual data based, at least in part, on an interpolation of facial structure data of the one or more users with one or more facial expression templates;

transmitting the attention data from each of the two or more communication devices to the computer;

transmitting teleconference data and the attention data from the computer to each of the two or more communication devices; and displaying the attention data on each of the two or more communication devices, wherein the attention data is displayed as a plurality of values, wherein each value of the plurality of values corresponds to each of other communication devices participating in the teleconference space.

9. The computer-implemented method of claim 8, wherein the teleconference data is one or more selected from a group consisting of: a video file, a real-time visual stream, one or more individual image snapshots and audio information.

10. The computer-implemented method of claim 8, further comprising comparing facial expressions data with one or more facial expression templates to interpolate emotions associated with one or more facial expressions.

11. The computer-implemented method of claim 8, wherein the identification information comprises:

end user ID information, end user personal identification number (PIN) information, communication device ID information or communication device MAC address information.

12. The computer-implemented method of claim 8, further comprising prioritizing the teleconference data transmitted to one or more predetermined communication devices based on the identification information.

13. The computer-implemented method of claim 8, displaying on each of the two or more communication devices a participant panel identifying participating communication devices by names of users associated with the participating communication devices or according to a corresponding type of communication device.

14. The computer-implemented method of claim 8, wherein the computer and the database comprises one or more cloud systems.

15. A non-transitory computer-readable storage medium embodied with software, the software when executed configured to:

generate, using a computer coupled with a database and comprising a processor and memory, a teleconference space in which two or more communication devices participate;

transmit requests to join the teleconference space to the two or more communication devices;

store in the computer memory identification information for each of the two or more communication devices;

store audiovisual data pertaining to one or more users associated with each of the two or more communication devices;

generate attention data from the audiovisual data based, at least in part, on an interpolation of facial structure data of the one or more users with one or more facial expression templates;

transmit the attention data value from each of the two or more communication devices to the computer;

transmitting teleconference data and the attention data from the computer to each of the two or more communication devices; and display the attention data on each of the two or more communication devices, wherein the attention data is displayed as a plurality of values, wherein each value of the plurality of values corresponds to each of other communication devices participating in the teleconference space.

16. The non-transitory computer-readable storage medium of claim 15, wherein the teleconference data is one or more selected from a group consisting of: a video file, a real-time visual stream, one or more individual image snapshots and audio information.

17. The non-transitory computer-readable storage medium of claim 15, wherein the software when executed is further configured to compare facial expressions data with one or more facial expression templates to interpolate emotions associated with one or more facial expressions.

18. The non-transitory computer-readable storage medium of claim 15, wherein the identification information comprises:

end user ID information, end user personal identification number (PIN) information, communication device ID information or communication device MAC address information.

19. The non-transitory computer-readable storage medium of claim 15, wherein the software when executed is further configured to prioritize the teleconference data transmitted to one or more predetermined communication devices based on the identification information.

20. The non-transitory computer-readable storage medium of claim 15, wherein the software when executed is further configured to display on each of the two or more communication devices a participant panel identifying participating communication devices by names of users associated with the participating communication devices or according to a corresponding type of communication device.

* * * * *